(12) United States Patent
Liu et al.

(10) Patent No.: US 12,309,093 B2
(45) Date of Patent: May 20, 2025

(54) METHODS AND APPARATUSES FOR CONFIGURING AND TRIGGERING APERIODIC SRS TRANSMISSION

(71) Applicant: LENOVO (BEIJING) LIMITED, Beijing (CN)

(72) Inventors: Bingchao Liu, Beijing (CN); Chenxi Zhu, Beijing (CN); Lianhai Wu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 462 days.

(21) Appl. No.: 17/598,552

(22) PCT Filed: Mar. 29, 2019

(86) PCT No.: PCT/CN2019/080369
§ 371 (c)(1),
(2) Date: Sep. 27, 2021

(87) PCT Pub. No.: WO2020/198914
PCT Pub. Date: Oct. 8, 2020

(65) Prior Publication Data
US 2022/0158796 A1 May 19, 2022

(51) Int. Cl.
H04W 72/23 (2023.01)
H04L 5/00 (2006.01)
(Continued)

(52) U.S. Cl.
CPC ....... H04L 5/0051 (2013.01); H04W 72/0446 (2013.01); H04W 72/23 (2023.01); H04W 80/02 (2013.01)

(58) Field of Classification Search
CPC . H04L 27/0006; H04L 5/0051; H04L 5/0053; H04L 5/0094; H04W 72/0446; H04W 72/23; H04W 80/02
See application file for complete search history.

(56) References Cited

U.S. PATENT DOCUMENTS 10,548,096 B2 * 1/2020 Papasakellariou .... H04W 52/30
2011/0200143 A1 * 8/2011 Koo ....................... H04L 5/0051
375/299
(Continued)

FOREIGN PATENT DOCUMENTS

BR 112019009928 B1 * 9/2023 ............. H04B 1/713
CN 104620645 A 5/2015
(Continued)

OTHER PUBLICATIONS

International Searching Authority, "Written Opinion of the International Searching Authority," PCT/CN2019/080369, Dec. 11, 2019, pp. 1-3.
(Continued)

Primary Examiner — Phuc H Tran
(74) Attorney, Agent, or Firm — Kunzler Bean & Adamson

(57) ABSTRACT

Methods, a base unit and a remote unit are disclosed. According to one embodiment, a method at a base unit, comprise: transmitting to a remote unit a higher layer signal for configuring one or more sounding reference signal (SRS) parameter sets for the transmission of SRS, wherein the SRS which includes a first type of SRS and a second type of SRS, the first type of SRS is transmitted at the last symbol in a normal subframe, and the second type of SRS is transmitted at any symbols other than the last symbol in the normal subframe, and transmitting to the remote unit a downlink control information (DCI) containing a SRS request field to trigger at least one SRS transmission.

20 Claims, 7 Drawing Sheets (a) Virtual cell ID will be used for legacy SRS (b) Virtual cell ID will not be used for legacy SRS

(51) Int. Cl.
*H04W 72/0446* (2023.01)
*H04W 80/02* (2009.01)

(56) References Cited

U.S. PATENT DOCUMENTS

| | | | | |
|---|---|---|---|---|
| 2018/0310257 | A1* | 10/2018 | Papasakellariou | H04W 52/367 |
| 2019/0280835 | A1* | 9/2019 | Määttänen | H04L 5/0048 |
| 2021/0058209 | A1* | 2/2021 | Qin | H04L 5/0023 |
| 2021/0058873 | A1* | 2/2021 | Gao | H04L 25/0226 |
| 2021/0135808 | A1* | 5/2021 | Choi | H04L 5/0048 |
| 2021/0144029 | A1* | 5/2021 | Wang | H04L 5/0051 |

FOREIGN PATENT DOCUMENTS

| | | | | |
|---|---|---|---|---|
| CN | 105490791 | A | | 4/2016 |
| MY | 200387 | A | * | 12/2023 |
| VN | 10037843 | B | * | 12/2023 | ........... H04B 7/0632 |
| VN | 10038425 | B | * | 1/2024 | ........... H04L 1/1812 |
| WO | WO-2014024724 | A1 | * | 2/2014 | .......... H04W 52/221 |
| WO | 2018063084 | A1 | | 4/2018 |

OTHER PUBLICATIONS

3GPP, Physical uplink shared channel related procedures, 3GPP TS 36.213 V14.9.0, Dec. 2018, pp. 1-72.
Huawei, Hisilicon, Remaining details on SRS design, 3GPP TSG RAN WG1 Meeting #91, R1-1719441, Nov. 27-Dec. 1, 2017, pp. 1-12, Reno, USA.
Nokia, Nokia Shanghai Bell, Discussion on introduction on additional SRS symbols, 3GPP TSG RAN WG1 Meeting #96, R1-1902855, Feb. 25-Mar. 1, 2019, pp. 1-3, Athens, Greece.
LG Electronics, Enhancements on SRS resource allocation, 3GPP TSG RAN WG1 Meeting #96, R1-1902075, Feb. 25-Mar. 1, 2019, pp. 1-4, Athens, Greece.
Nokia, Nokia Shanghai Bell, Remaining details on SRS design in NR, 3GPP TSG RAN WG1 Meeting #91, R1-1720897, Nov. 27-Dec. 1, 2017, pp. 1-7, Reno, Nevada, USA.

* cited by examiner

| $C_7$ | $C_6$ | $C_5$ | $C_4$ | $C_3$ | $C_2$ | R | R | Oct 1 |

Figure 4

(a) SRS Activation/Deactivation MAC CE for aperiodic SRS triggered by single bits SRS request (b) SRS Activation/Deactivation MAC CE for aperiodic SRS triggered by 2 bits SRS request (a) Virtual cell ID will be used for legacy SRS (b) Virtual cell ID will not be used for legacy SRS

METHODS AND APPARATUSES FOR CONFIGURING AND TRIGGERING APERIODIC SRS TRANSMISSION

FIELD

The subject matter disclosed herein generally relates to wireless communications and, more particularly, to methods and apparatuses for configuring and triggering aperiodic SRS transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI), Transmitter Receiver Point (TRP), Time Division Duplex (TDD), Radio Resource Control (RRC), Media Access Control (MAC), Control Element (CE), licensed-assisted access (LAA), secondary cell (SCell), Protocol Data Unit (PDU).

SRS is transmitted on the uplink and allow the network to estimate the state of the uplink channel. SRS transmission can also be used for uplink timing estimation as well as to estimate downlink channel conditions assuming downlink/uplink channel reciprocity.

Currently, enhancement of SRS capacity and coverage is approved in LTE Release16. More than one symbols in a normal subframe can be used for SRS transmission in LTE Release 16 and the SRS transmitted at the symbols other than the last symbol in a normal subframe called additional SRS. The minimum SRS resource allocation granularity for a cell can be one slot when more than one symbol in a normal subframe is allocated for SRS for the cell. Aperiodic SRS transmission for additional SRS symbol(s) can be configured in any symbols other than the last symbol in the normal subframe. SRS transmitted at the last symbol in a normal subframe called legacy SRS. And aperiodic additional SRS and aperiodic legacy SRS can be transmitted in the same subframe.

BRIEF SUMMARY

Methods and apparatuses for configuring and triggering aperiodic SRS transmission are disclosed.

In one embodiment, a method at a base unit, comprises transmitting to a remote unit a higher layer signal for configuring one or more sounding reference signal (SRS) parameter sets for the transmission of SRS, wherein the SRS which includes a first type of SRS and a second type of SRS, the first type of SRS is transmitted at the last symbol in a normal subframe, and the second type of SRS is transmitted at any symbols other than the last symbol in the normal subframe, and transmitting to the remote unit a downlink control information (DCI) containing a SRS request field to trigger at least one SRS transmission.

In another embodiment, a method at a remote unit, comprises: receiving from a base unit a higher layer signaling for configuring one or more sounding reference signal (SRS) parameter sets for the transmission of SRS, wherein the SRS which includes a first type of SRS and a second type of SRS, the first type of SRS is transmitted at the last symbol in a normal subframe, and the second type of SRS is transmitted at any symbols other than the last symbol in the normal subframe, and receiving from the base unit a downlink control information (DCI) containing a SRS request field to trigger at least one SRS transmission.

In another embodiment, a base unit, comprises: a transceiver; a memory; a processor coupled to the transceiver and the memory and configured to: transmit to a remote unit a higher layer signal for configuring one or more sounding reference signal (SRS) parameter sets for the transmission of SRS, wherein the SRS which includes a first type of SRS and a second type of SRS, the first type of SRS is transmitted at the last symbol in a normal subframe, and the second type of SRS is transmitted at any symbols other than the last symbol in the normal subframe, and transmit to the remote unit a downlink control information (DCI) containing a SRS request field to trigger at least one SRS transmission.

In another embodiment, a remote unit, comprises: a transceiver; a memory; a processor coupled to the transceiver and the memory and configured to: receive from a base unit a higher layer signaling for configuring one or more sounding reference signal (SRS) parameter sets for the transmission of SRS, wherein the SRS which includes a first type of SRS and a second type of SRS, the first type of SRS is transmitted at the last symbol in a normal subframe, and the second type of SRS is transmitted at any symbols other than the last symbol in the normal subframe, and receive from the base unit a downlink control information (DCI) containing a SRS request field to trigger at least one SRS transmission.

It will be appreciated by persons skilled in the art that the effects that could be achieved with the present disclosure are not limited to what has been particularly described hereinabove and the above and other effects that the present disclosure could achieve will be more clearly understood from the following detailed description.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and therefore are not to be considered to be limiting of scope, the embodiments will be described and explained with additional specificity and detail through the use of the accompanying drawings, in which:

FIG. 4 is a schematic diagram illustrating MAC CE according to an embodiment;

DETAILED DESCRIPTION

Figure 1:
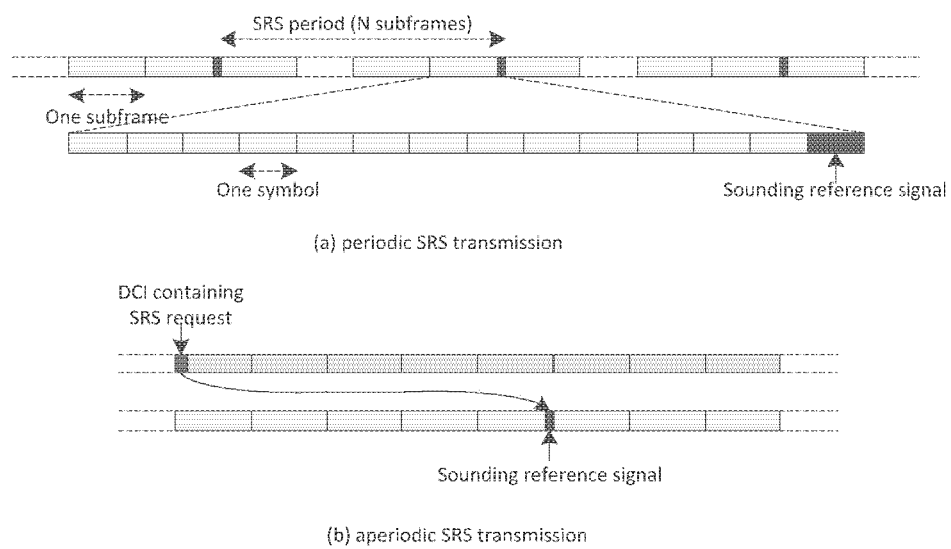
FIGS. 1 (a) and (b) are schematic diagrams illustrating legacy SRS transmission.

As will be appreciated by one skilled in the art, aspects of the described embodiments may be embodied as a system, apparatus, method, or program product. Accordingly, embodiments may take the form of an hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions and/or acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function and/or act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions and/or acts specified in the flowchart and/or block diagram block or blocks.

The schematic flowchart diagrams and/or schematic block diagrams depicted in accompanying Figures illustrate the architecture, functionality, and operation of possible implementations of apparatuses, systems, methods and program products according to various embodiments described below. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

SRS are transmitted on the uplink to allow for the base station to estimate the uplink channel state. Legacy SRS refers to the SRS defined in LTE Release 8 and Release 10. The legacy SRS can only be transmitted at the last symbol in a normal subframe or transmitted at the symbols in the special subframe for TDD operation. SRS transmission can also be used for uplink timing estimation as well as to estimate downlink channel conditions assuming downlink/uplink channel reciprocity.

FIGS. 1 (a) and (b) are schematic diagrams illustrating legacy SRS transmission.

There are two types of SRS transmission defined in LTE, i.e. periodic SRS transmission triggered by higher layer signaling and aperiodic SRS or type 1 SRS transmission triggered by DCI. As illustrated in FIG. 1 (a), UE transmits SRS with a certain period (such as N subframes) which is configured by higher layer signaling. SRS can only be transmitted at the last symbol of a normal subframe. As illustrated in FIG. 1 (b), UE transmits aperiodic SRS in response to a SRS request contained in a DCI.

Additional SRS is introduced in LTE Release 16 to enhance the SRS capacity, and the additional SRS can be transmitted at any symbols other than the last symbol in the normal subframe.

Figure 2:
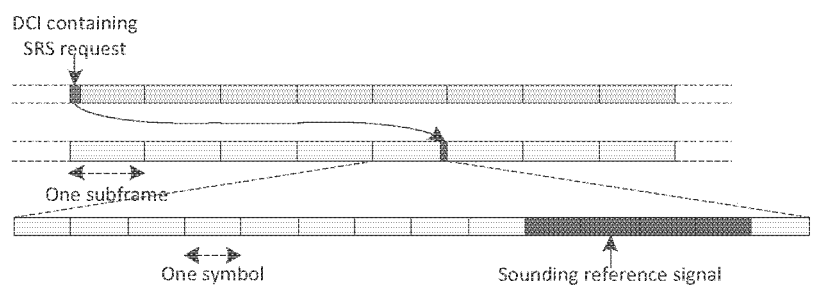
FIG. 2 is a schematic diagram illustrating additional SRS transmission.

FIG. 2 is a schematic diagram illustrating additional SRS transmission.

As illustrated in FIG. 2, UE transmits SRS triggered by a DCI containing a SRS request field. And the aperiodic SRS is transmitted at the $10^{th}$, the $11^{th}$, the $12^{th}$, and the $13^{th}$ symbol in a normal subframe.

Figure 3:
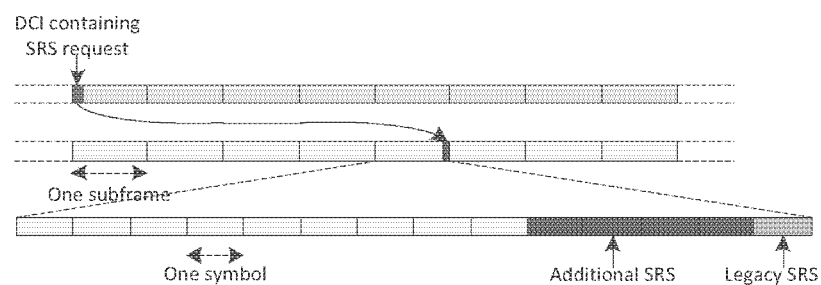
FIG. 3 is a schematic diagram illustrating the concurrent transmission of additional SRS and legacy SRS.

FIG. 3 is a schematic diagram illustrating the concurrent transmission of additional SRS and legacy SRS.

Aperiodic additional SRS and aperiodic legacy SRS can be transmitted in the same subframe. As illustrated in FIG. 3, a DCI containing SRS request field triggers the transmission of aperiodic additional SRS and aperiodic legacy SRS. The additional SRS is transmitted at the $10^{th}$, the $11^{th}$, the $12^{th}$, and the $13^{th}$ symbol in a subframe, while the legacy SRS is transmitted at the $14^{th}$ symbol which is the last symbol in the same subframe.

Both intra-subframe frequency hopping and repetition are supported for aperiodic additional SRS. Intra-subframe antenna switching is supported for aperiodic additional SRS. Both legacy SRS and additional SRS symbol(s) can be configured for the same UE. In the case that legacy SRS is aperiodic, UE can transmit one of legacy SRS or additional SRS symbol(s) in the same subframe. In case that legacy SRS is periodic, UE can transmit legacy SRS and additional SRS symbol(s) in the same or different subframe. In case that legacy SRS is aperiodic, UE can transmit legacy SRS and additional SRS symbol(s) in the same subframe and therefore a triggering mechanism needs to be introduced.

The numbers of additional SRS symbols that can be configured to a UE is 1-13. The time location of possible additional SRS symbols in one normal UL subframe for a cell is the $1^{st}$ to the $13^{th}$ symbol in one subframe. Same power control configuration applies for all additional SRS symbols configured to a single UE. Transmission of aperiodic legacy SRS and aperiodic additional SRS symbol(s) in the same subframe for a UE is supported.

Virtual cell ID is used for the SRS sequence initialization, and it can be configured by higher layers signal, e.g. ScramblingIdentity defined in SoundingRS-UL-Config_information element as Table 1. Here the virtual cell ID may also be referred as scrambling ID for SRS.

TABLE 1

| SoundingRS-UL-Config information element |
|---|
| -- ASN1START<br>SoundingRS-UL-Config-r16 ::= CHOICE {<br>  release NULL,<br>  setup SEQUENCE {<br>    scramblingIdentity-r16 INTEGER (0..503),<br>  }<br>} |

Virtual cell ID for SRS will be determined as follow:

$n_{ID}^{RS} = N_{ID}^{cell}$, if no value for $n_{ID}^{SRS}$, i.e. ScramblingIdentity for SRS, is configured by higher layers, where $N_{ID}^{cell}$ is the physical cell ID, $n_{ID}^{RS} = n_{ID}^{SRS}$, otherwise.

Configured scrambling identity for SRS is at least used for additional SRS symbols and can also be used for legacy SRS symbol. When a scrambling identity for SRS is configured, it applies to both legacy and additional SRS symbol(s). Alternatively, when a scrambling identity for SRS is configured, eNB has the flexibility to apply the scrambling identity for SRS to only legacy SRS, only additional SRS symbol(s) or both legacy and additional SRS symbol(s). If scrambling identity for SRS is not configured, physical cell ID is used.

Aperiodic SRS (referred as type 1 SRS) transmission of legacy SRS symbol is triggered by the SRS request field contained for DCI format 0/0A/0B/4/4A/4B/1A/6-0A/6-1A/2B/2C/2D/3B.

For trigger type 1 and DCI format 4/4A/4B three sets of SRS parameters, srs-ConfigApDCI-Format4, are configured by higher layer signaling. The 2-bit SRS request field for DCI format 4/4A/4B indicates the SRS parameter set given in Table 2.

TABLE 2

SRS request value for trigger type 1 for DCI format 4/4A/4B

| Value of SRS request field | Description |
|---|---|
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

For trigger type 1 and DCI format 0/0A/0B/6-0A, a single set of SRS parameters, srs-ConfigApDCI-Format0, is configured by higher layer signaling.

For trigger type 1 and DCI formats 1A/2B/2C/2D/6-1A, a single common set of SRS parameters, srs-ConfigApDCI-Format1a2b2c, is configured by higher layer signaling.

For a serving cell that is not a licensed-assisted access (LAA) secondary cell (SCell), the SRS request field is 1 bit for DCI formats 0/1A/2B/2C/2D/6-0A/6-1A, with a type 1 SRS triggered if the value of the SRS request field is set to '1'.

The SRS request field is 1 bit for DCI formats 0A, with a type 1 SRS triggered if the value of the SRS request field is set to '1'. The 2-bit SRS request field for DCI format 0B indicates the type 1 SRS triggering and PUSCH subframe with SRS as given in Table 3.

TABLE 3

SRS request value for trigger type 1 for DCI format 0B

| Value of SRS request field | Description |
|---|---|
| '00' | No type 1 SRS trigger |
| '01' | Type 1 SRS trigger and first scheduled PUSCH subframe |
| '10' | Type 1 SRS trigger and second scheduled PUSCH subframe |
| '11' | Type 1 SRS trigger and last scheduled PUSCH subframe |

For a serving cell that is not a LAA SCell, a 1-bit SRS request field shall be included for DCI formats 0/1A for frame structure type 1 and in DCI 0/1A/2B/2C/2D for frame structure type 2 if the UE is configured with SRS parameters for DCI formats 0/1A/2B/2C/2D by higher-layer signaling. A 1-bit SRS request field shall be included for DCI formats 6-0A/6-1A, the value of which is reserved if the UE is not configured with SRS parameters for DCI formats 6-0A/6-1A by higher layer signaling.

Additional SRS parameters sets for additional SRS symbol(s) will be configured by higher layer signaling in LTE Release 16. The key issue is how to trigger a certain aperiodic SRS transmission for additional SRS symbol(s) with minimized spec impact. For example, 6 SRS parameters sets are configured by higher layer signaling, the 1$^{st}$/2$^{nd}$/3$^{rd}$ SRS parameters sets are for legacy SRS symbol and the 4$^{th}$/5$^{th}$/6$^{th}$ SRS parameter sets are for additional SRS symbol(s), there is a need of a method for triggering the aperiodic additional SRS transmission by using the existing DCI formats.

Transmission of legacy SRS symbol should not be affected by configuration or transmission of additional SRS symbol(s). Transmission of additional SRS symbol(s) should not be affected by configuration or transmission of legacy SRS symbol.

In order to solve the above technique issues, the present invention proposes the following solutions.

Solution 1: Reinterpreting the SRS request field in the existing DCI formats

In this solution, the existing DCI formats are keeping and more bits for SRS request field in the DCI are introduced for flexible SRS triggering. The number of SRS request field bits is configured by a higher layer signaling. Considering the potential use case that aperiodic legacy SRS and aperiodic additional SRS can be simultaneously triggered by one DCI with single SRS request field, new tables for SRS request field triggering state are also proposed.

For a serving cell that is not a LAA SCell, the SRS request field is 1 or 2 bits, which is configured by higher layer parameters, for DCI formats 6-0A/6-1A. And the SRS request field is 0 or 1 or 2 bits, which is configured by higher layer parameters, for DCI formats 0/1A/2B/2C/2D.

Up to 2 sets of SRS parameters are configured for DCI format 0/1A/2B/2C/2D/6-0A/6-1A by higher layer signaling when 2 bits SRS request field are configured, one for legacy SRS and the other for additional SRS. The 2-bit SRS request field for DCI format 0/1A/2B/2C/2D/6-0A/6-1A indicates the SRS parameters set given in Table 4.

TABLE 4

SRS request value for trigger type 1 for DCI format 0/1A/2B/2C/2D/6-0A/6-1A

| Value of SRS request field | Description |
|---|---|
| '00' | No type 1 SRS trigger |
| '01' | The $1^{st}$ SRS parameters set configured by higher layers |
| '10' | The $2^{nd}$ SRS parameters set configured by higher layers |
| '11' | The $1^{st}$ and the $2^{nd}$ SRS parameters sets configured by higher layers |

Alternatively, the bits width of the existing SRS request field may not be changed. Considering the case where the UE transmits additional SRS and legacy SRS in the same subframe, a specific value of the SRS request filed, originally associated with only one SRS parameters set, can be associated with two SRS parameters sets, one for legacy SRS symbol and one for additional SRS symbol(s).

For trigger type 1 and DCI format 0/1A/2B/2C/2D/6-0A/6-1A with 1 bit SRS request field, a single set of SRS parameters for additional SRS symbol(s) or a single set of SRS parameters for legacy SRS symbol are configured by higher layer signaling. An aperiodic SRS transmission for both additional SRS symbol(s) and legacy SRS symbol is triggered if the value of the SRS request field is set to '1'.

Two or three bits SRS request field, which is configured by higher layer parameters, can be contained for DCI format 4/4A/4B, and up to seven sets of SRS parameters can be configured. If 3-bits SRS request field is used, the 3-bit SRS request field for DCI format 4/4A/4B indicates the SRS parameter set given in Table 5.

TABLE 5

SRS request value for trigger type 1 for DCI format 4/4A/4B

| Value of SRS request field | Description |
|---|---|
| '000' | No type 1 SRS trigger |
| '001' | The $1^{st}$ SRS parameter set configured by higher layers |
| '010' | The $2^{nd}$ SRS parameter set configured by higher layers |
| '011' | The $3^{rd}$ SRS parameter set configured by higher layers |
| '100' | The $4^{th}$ SRS parameter set configured by higher layers |
| '101' | The $5^{th}$ SRS parameter set configured by higher layers |
| '110' | The $6^{th}$ SRS parameter set configured by higher layers |
| '111' | The $7^{th}$ SRS parameter set configured by higher layers |

For trigger type 1 and DCI format 4/4A/4B with 2 bits SRS request field, three sets of SRS parameters for additional SRS symbol(s) and three sets of SRS parameters for legacy SRS symbol are configured by higher layer signaling. The 2-bit SRS request field in the DCI indicates the SRS parameter set given in Table 6.

TABLE 6

SRS request value for trigger type 1 for DCI format 4/4A/4B

| Value of SRS request field | Description |
|---|---|
| '00' | No type 1 SRS trigger |
| '01' | The $1^{st}$ SRS parameter set for legacy SRS symbol configured by higher layers<br>The $1^{st}$ SRS parameter set for additional SRS symbol(s) configured by higher layers |
| '10' | The $2^{nd}$ SRS parameter set for legacy SRS symbol configured by higher layers<br>The $2^{nd}$ SRS parameter set for additional SRS symbol(s) configured by higher layers |
| '11' | The $3^{rd}$ SRS parameter set for legacy SRS symbol configured by higher layers<br>The $3^{rd}$ SRS parameter set for additional SRS symbol(s) configured by higher layers |

If 6 SRS parameters sets are configured by higher layer signaling, the first 3 sets are for legacy SRS and the second 3 sets are for additional SRS. Table 6 can be updated as Table 7.

TABLE 7

SRS request value for trigger type 1 for DCI format 4/4A/4B

| Value of SRS request field | Description |
|---|---|
| '00' | No type 1 SRS trigger |
| '01' | The $1^{st}$ and the $4^{th}$ SRS parameter sets configured by higher layers |
| '10' | The $2^{nd}$ and the $5^{th}$ SRS parameter sets configured by higher layers |
| '11' | The $3^{rd}$ and the $6^{th}$ SRS parameter sets configured by higher layers |

For the case that aperiodic legacy SRS and additional SRS are independently triggered, the existing DCI formats and the corresponding trigger mechanism can be reused. The gNB can reconfigure or update the SRS parameters sets by higher layer signaling. The parameters for the SRS transmitted in the same subframe for legacy SRS symbol and additional SRS symbol(s) can be configured in one set.

Another embodiment is to configure multiple combinations of SRS parameter sets, where each combination containing one or more SRS parameter sets that can be for legacy SRS or additional SRS symbol(s_. For DCI format 4/4A/4B, they are triggered as in the following Table 8.

TABLE 8

SRS request value for trigger type 1 for DCI format 4/4A/4B

| Value of SRS request field | Description |
|---|---|
| '00' | No type 1 SRS trigger |
| '01' | The $1^{st}$ combination of SRS parameter sets configured by higher layers |
| '10' | The $2^{nd}$ combination of SRS parameter sets configured by higher layers |
| '11' | The $3^{rd}$ combination of SRS parameter sets configured by higher layers |

An example of the configured combination can be: the $1^{st}$ combination contains a SRS parameter set for legacy SRS symbol; the $2^{nd}$ combination contains a SRS parameter set for additional SRS symbol(s); the $3^{rd}$ combination contains a SRS parameter set for legacy SRS symbol and another SRS parameter set for additional SRS symbol(s). The legacy (or additional) SRS parameters parameter set in the $1^{st}$ (or $2^{nd}$) combination may be the same or different as that in the $3^{rd}$ combination.

It has described that the size of the SRS request field in the existing DCI formats is configurable to trigger aperiodic SRS transmission for additional SRS symbol(s). Another approach is keeping the bits width of existing SRS request field. Conventionally, the number of SRS parameters sets configured by higher layers correspond to the number of non-zero states of SRS request field. In order to support additional SRS transmission, more SRS parameters sets can be configured by higher layers. A MAC CE is introduced to activate or deactivate certain SRS parameters sets among the configured multiple SRS parameter sets. And DCI containing SRS request field is used to trigger SRS transmission with the activated SRS parameters sets.

Solution 2: RRC+MAC CE Selection

Multiple SRS parameter sets can be configured by higher layer signaling. An SRS Activation/Deactivation MAC CE is used to activate or deactivate one or more SRS parameters sets. The SRS Activation/Deactivation MAC CE is identified by a MAC PDU subheader with a dedicated logical channel identity (LCID).

One or more sets are activated via a SRS Activation/Deactivation MAC CE. The UE shall associate the higher layer parameter sets with each SRS request value no earlier than subframe n+M (M≥4) after the hybrid automatic repeat quest acknowledge (HARQ-ACK) corresponding to the PDSCH carrying the selection command is transmitted in subframe n. There are 2 MAC CE schemes.

1. MAC CE Scheme 1

Up to 8 SRS parameters set can be configured by higher layer signaling. The MAC CE has a fixed size and consists of a single octet containing N(N>=1) C-fields and 8-N R-fields.

Figure 4:
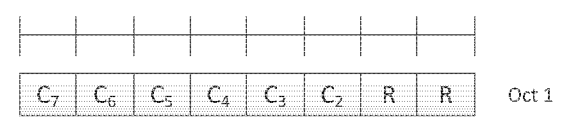

FIG. 4 is a schematic diagram illustrating MAC CE according to an embodiment

As illustrated in FIG. 4, the Activation/Deactivation of SRS parameters set MAC control element is defined as follow:

$C_i$: if two or more SRS parameters sets are configured by higher layers, this field indicates the activation/deactivation status of the SRS parameter set with SetIndex i, else the MAC entity shall ignore the $C_i$ field. The $C_i$ field is set to "1" to indicate that the SRS parameter set with SetIndex i shall be activated. The $C_i$ field is set to "0" to indicate that the SRS parameter set with SetIndex i shall be deactivated;

R: Reserved bit, set to '0'.

For trigger type 1 and DCI format 0/1A/2B/2C/2D/6-0A/6-1A a single SRS parameters set configured by higher layer is activated. An aperiodic SRS transmission can be triggered if the value of the SRS request field is set to '1'.

For trigger type 1 and DCI format 4/4A/4B, three sets of SRS parameters sets configured by higher layers are activated. The 2-bit SRS request field in the DCI indicates the SRS parameter sets given in Table 9.

TABLE 9

SRS request value for trigger type 1 for DCI format 4/4A/4B

| Value of SRS request field | Description |
|---|---|
| '00' | No type 1 SRS trigger |
| '01' | The $1^{st}$ activated SRS parameter set configured by higher layers |
| '10' | The $2^{nd}$ activated SRS parameter set configured by higher layers |
| '11' | The $3^{rd}$ activated SRS parameter set configured by higher layers |

For example, when 6 sets of SRS parameters are configured by higher layers, the MAC CE will consist of a single octet containing 6 C-fields and 2 R-fields. If the UE receives a MAC CE with the value '01100100', the $2^{nd}$, $3^{rd}$ and $6^{th}$ set are activated, and the SRS corresponding to the $2^{nd}$ set of SRS parameters will be triggered if the UE receives a DCI format 4 with SRS request field set to '01'.

2. MAC CE Scheme 2 a) For DCI format 0/1A/2B/2C/2D/6-0A/6-1A

The MAC CE has a fixed size and consists of a single octet containing N(N>=1) C-fields and 8-N R-fields for the case that single bit SRS request field contained in the DCI formats, i.e. DCI format 0/1A/2B/2C/2D/6-0A/6-1A, is used to trigger aperiodic SRS transmission.

FIG. 5(a) is schematic diagrams illustrating SRS Activation/Deactivation MAC CE for aperiodic SRS triggered by single bit SRS request.

Figure 5:
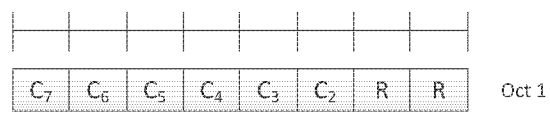
FIGS. 5 (a) and (b) are schematic diagrams illustrating MAC CE according to another embodiment.
Figure 5:
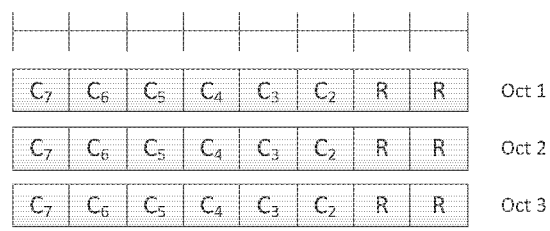

As illustrated in FIG. 5 (a), the Activation/Deactivation of SRS parameters set MAC control element is defined as follow:

$C_i$: if two or more SRS parameters sets are configured by higher layers, this field indicates the activation/deactivation status of the SRS parameter set with SetIndex i, else the MAC entity shall ignore the $C_i$ field. The $C_i$ field is set to "1" to indicate that the SRS parameter set with SetIndex i shall be activated. The $C_i$ field is set to "0" to indicate that the SRS parameter set with SetIndex i shall be deactivated;

R: Reserved bit, set to '0'.

For trigger type 1 and DCI format 0/1A/2B/2C/2D/6-0A/6-1A, one or more SRS parameters sets configured by higher layers are activated. An aperiodic SRS transmission can be triggered if the value of the SRS request field is set to '1'.

b) For DCI format 4/4A/4B

The MAC CE has a fixed size and consists of three octets each containing N(N>=1) C-fields and 8-N R-fields for the case that 2 bits SRS request field contained in the DCI formats, i.e. DCI format 4/4A/4B is used to trigger aperiodic SRS transmission.

FIG. 5(b) is schematic diagrams illustrating SRS Activation/Deactivation MAC CE for aperiodic SRS triggered by 2 bits SRS request.

As illustrated in FIG. 5 (b), the Activation/Deactivation of SRS parameters set MAC control element is defined as follow:

$C_i$: if two or more SRS parameters sets are configured by higher layers, this field indicates the activation/deactivation status of the SRS parameter set with SetIndex i, else the MAC entity shall ignore the $C_i$ field. The $C_i$ field is set to "1" to indicate that the SRS parameter set with SetIndex i shall be activated. The $C_i$ field is set to "0" to indicate that the SRS parameter set with SetIndex i shall be deactivated;

R: Reserved bit, set to '0'.

Oct 1 is used to indicated the activated SRS parameters sets associated SRS request value '01'.

Oct 2 is used to indicated the activated SRS parameters sets associated SRS request value '10'.

Oct 3 is used to indicated the activated SRS parameters sets associated SRS request value '11'.

For trigger type 1 and DCI format 4/4A/4B, multiple sets of SRS parameters configured by higher layers are activated. The 2-bit SRS request field in the DCI indicates the SRS parameter sets given in Table 10.

TABLE 10

SRS request value for trigger type 1 for DCI format 4/4A/4B

| Value of SRS request field | Description |
|---|---|
| '00' | No type 1 SRS trigger |
| '01' | The SRS parameter sets configured by higher layers and activated by the $1^{st}$ octet of the most recently received MAC CE Activation/Deactivation command |
| '10' | The SRS parameter sets configured by higher layers and activated by the $2^{nd}$ octet of the most recently received MAC CE Activation/Deactivation command |
| '11' | The SRS parameter sets configured by higher layers and activated by the $3^{rd}$ octet of the most recently received MAC CE Activation/Deactivation command |

For example, when 6 set of SRS parameters are configured by higher layers, the MAC CE will consist a single octet containing 6 C-fields and 2 R-fields for DCI format 0/1A/2B/2C/2D/6-0A/6-1A, and the MAC CE will consist three octets containing 6 C-fields and 2 R-fields for DCI format 4/4A/4B. If the UE receives a DCI format 0 with SRS request field set to '1', and the corresponding MAC CE command with the value '01100000', the SRS corresponding to the $2^{nd}$ and the $3^{rd}$ set are triggered simultaneously.

Virtual cell ID configured as scrambling identity will be introduced to SRS transmission for additional SRS symbols and it can also be used for legacy SRS symbol. There is a need for a method for indicating the UE to apply the configured scrambling identity for SRS sequence generation for legacy SRS symbol. Here below are 3 proposed methods.

Alt. 1 When scrambling identity for SRS is configured, UE may only apply the virtual cell ID for aperiodic legacy SRS symbol for the case that aperiodic legacy SRS and aperiodic additional SRS symbol(s) are triggered in the same subframe, i.e. $n_{ID}^{SRS}=n_{ID}^{SRS}$. Otherwise $n_{ID}^{RS}=N_{ID}^{cell}$ will be used for legacy SRS symbol.

FIGS. 6(a) and (b) are schematic diagrams illustrating the use of virtual cell ID according to an embodiment.

Figure 6:
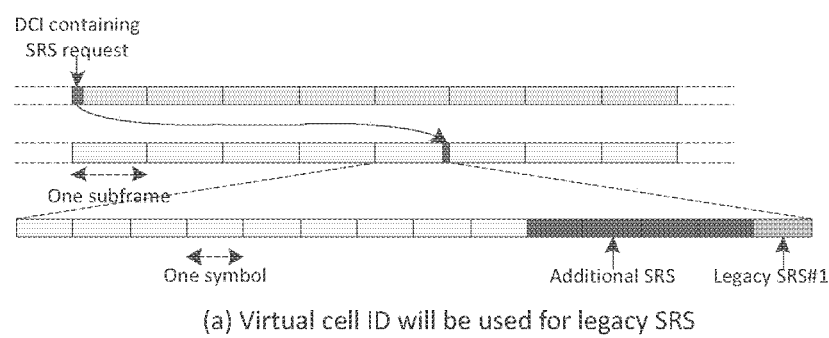
FIGS. 6 (a) and (b) are schematic diagrams illustrating the use of virtual cell identity (ID) according to an embodiment.
Figure 6:
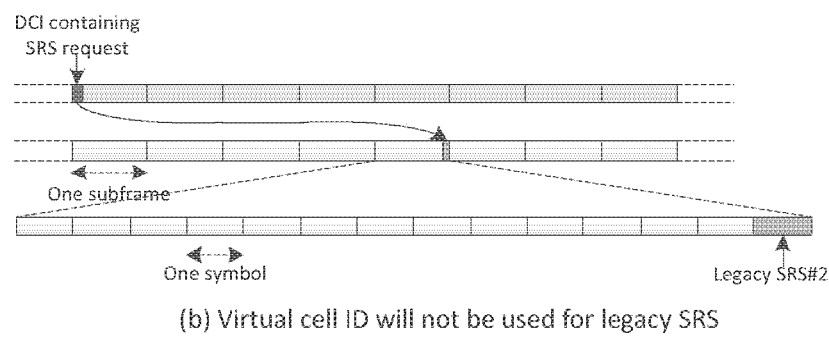

As illustrated in FIG. 6 (a), since additional SRS and legacy SRS #1 are transmitted in the same subframe, scrambling identity for SRS will be applied for legacy SRS #1 when it is configured by higher layer.

In contrast, scrambling identity for SRS will not be used for legacy SRS #2 even if it is configured since aperiodic legacy SRS and aperiodic additional SRS symbol(s) are not triggered in the same subframe as illustrated in FIG. 6 (b).

Alt. 2 Single bit scrambling identity indicator field can be introduced in the DCI format 0/0A/0B/4/4A/4B/1A/6-0A/6-1A/2B/2C/2D/3B, and this field only present when scrambling identity for SRS is configured by higher layers. The configured scrambling identity will be applied for corresponding SRS transmission if the value of scrambling identity indicator field is set to '1'.

The configuration of scrambling identity indicator field in DCI format 0 is shown in Table 11.

TABLE 11

Configuration of scrambling identity indicator field in DCI format 0

Format 0
DCI format 0 is used for the scheduling of PUSCH in one UL cell.
The following information is transmitted by means of the DCI format 0:

...
- Scrambling identity-1 bit as defined in TS36.211. This field is only present when scrambling Identity for SRS is configured by higher layers.
...

Alt. 3 MAC CE command is used to activate or deactivate the configured scrambling identity for legacy SRS.

An SRS Activation/Deactivation MAC CE is used to activate or deactivate the configured scrambling identity for SRS, when scrambling identity for SRS is configured by higher layers.

The UE shall apply the scrambling identity for the legacy SRS no earlier than subframe n+M (M≥4) after the HARQ-ACK corresponding to the PDSCH carrying the selection command is transmitted in subframe n.

When the scrambling identity for SRS is configured by higher layers, it can only be determined as the virtual cell ID for legacy SRS when it is activated by the MAC CE.

Figure 7:
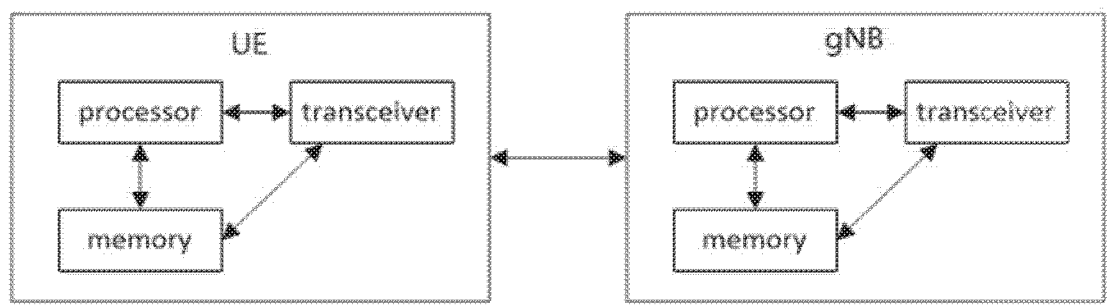
FIG. 7 is a schematic block diagram illustrating apparatuses according to one embodiment.

FIG. 7 is a schematic block diagram illustrating apparatuses according to one embodiment.

Referring to FIG. 7, The UE includes a processor, a memory, and a transceiver. The processor implements a function, a process, and/or a method which are proposed in FIGS. 1 to 6 above. The gNB includes a processor, a memory, and a transceiver. The processors implement a function, a process, and/or a method which are proposed in FIGS. 1 to 6 above. Layers of a radio interface protocol may be implemented by the processors. The memories are connected with the processors to store various pieces of information for driving the processors. The transceivers are connected with the processors to transmit and/or receive a radio signal.

The memories may be positioned inside or outside the processors and connected with the processors by various well-known means. Further, the relay node may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Proposed several solutions that reuse the SRS request field in the existing DCI format to trigger aperiodic additional SRS. Configurable size of SRS request field in the existing DCI formats with new tables are introduced to trigger aperiodic SRS transmission for additional SRS symbols. The bit width of SRS request field is configured by higher layer signaling. Allowing multiple SRS configured by different SRS parameters sets can be triggered by one DCI with a single SRS request field. Multiple SRS parameters sets can be configured, while only part of them are activated by a MAC CE activation/deactivation command.

Proposed several schemes to indicate the configured scrambling identity is used for legacy SRS. Scrambling identity shall be used for the case that one aperiodic legacy SRS and one aperiodic additional SRS are triggered in the same subframe. Introduce one bit in the DCI triggering aperiodic SRS to indicate whether the configured scrambling identity will be used for the triggered legacy SRS. MAC CE activation/deactivation command is used to activate or deactivate the configured scrambling identity for legacy SRS.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a base station, the method comprising:
   transmitting to a user equipment (UE) a higher layer signal for configuring one or more sounding reference signal parameter sets for transmission of a sounding reference signal, wherein the sounding reference signal includes a first sounding reference signal associated with a first trigger type and a second sounding reference signal associated with a second trigger type, the first sounding reference signal is transmitted at the last symbol in a normal subframe, and the second sounding reference signal is transmitted at any symbol other than the last symbol in the normal subframe; and
   transmitting to the UE a downlink control information containing a sounding reference signal request field to trigger at least one sounding reference signal transmission, wherein a value of the sounding reference signal request field indicates two or more sounding reference signal parameter sets of the one or more sounding reference signal parameter sets.

2. The method of claim 1, further comprising:
   configuring a bit width of the sounding reference signal request field in the downlink control information, wherein the sounding reference signal request field is configured for downlink control information format 0/1A/2B/2C/2D for a serving cell that is not a licensed-assisted access cell.

3. The method of claim 2, wherein when a single bit sounding reference signal request field is configured for the downlink control information format 0/1A/2B/2C/2D for a serving cell that is not a licensed-assisted access secondary cell and 2 sounding reference signal parameters sets are configured, a sounding reference signal transmission corresponding to both sounding reference signal parameters sets is triggered if a value of the sounding reference signal request field is set to '1'.

4. The method of claim 1, further comprising:
   configuring a bit width of sounding reference signal request field in the downlink control information, wherein the sounding reference signal request field is configured for downlink control information format 4.

5. The method of claim 4, wherein when 2 bits sounding reference signal request field is configured for the downlink control information format 4 and more than three sounding reference signal parameters sets are configured, a sounding reference signal transmission corresponding to multiple sets is triggered if the value of the sounding reference signal request field is not set to '00'.

6. The method of claim 1, further comprising:
   transmitting to the UE a medium access control control element to activate or deactivate the one or more sounding reference signal parameters sets.

7. The method of claim 6, wherein the medium access control control element has a fixed size and consists of a single octet containing N C-fields and 8-N R-fields where N is an integer greater than 1, and wherein each of the C fields is used to indicate whether the sounding reference signal parameters set corresponding to the C-field is activated or deactivated, and each R-field contains a reserved bit setting to '0'.

8. The method of claim 6, wherein the medium access control control element has a fixed size and consists of three octets each containing N C-fields and 8-N R-fields, where N is an integer greater than 1:
   a first octet is used to activate or deactivate sounding reference signal parameters sets associated with the sounding reference signal request field '01';
   a second octet is used to activate or deactivate sounding reference signal parameters sets associated with the sounding reference signal request field '10';
   a third octet is used to activate or deactivate sounding reference signal parameters sets associated with the sounding reference signal request field '11'; and
   wherein each of the C fields is used to indicate whether the sounding reference signal parameters set corresponding to the C-field is activated or deactivated, and each R-field contains a reserved bit setting to '0'.

9. The method of claim 1, wherein the sounding reference signal parameters for the first sounding reference signal and the second sounding reference signal are configured independently.

10. The method of claim 1, wherein a scrambling identity is used for the first sounding reference signal triggered by downlink control information if the first sounding reference signal and the second sounding reference signal are triggered in the same subframe.

11. A method at a user equipment (UE), the method comprising:
    receiving from a base station a higher layer signaling for configuring one or more sounding reference signal parameter sets for transmission of a sounding reference signal, wherein the sounding reference signal includes a first sounding reference signal associated with a first trigger type and a second sounding reference signal associated with a second trigger type, the first sounding reference signal is transmitted at the last symbol in a normal subframe, and the second sounding reference signal is transmitted at any symbols other than the last symbol in the normal subframe; and
    receiving from the base station a downlink control information containing a sounding reference signal request field to trigger at least one sounding reference signal transmission, wherein a value of the sounding reference signal request field indicates two or more sounding reference signal parameter sets of the one or more sounding reference signal parameter sets.

12. A base station, comprising:
    at least one memory; and
    at least one processor coupled with the at least one memory and configured to cause the base station to:
       transmit to a user equipment (UE) a higher layer signal for configuring one or more sounding reference signal parameter sets for transmission of a sounding reference signal, wherein the sounding reference signal includes a first sounding reference signal associated with a first trigger type and a second sounding reference signal associated with a second trigger type, the first sounding reference signal is transmitted at the last symbol in a normal subframe, and the second sounding reference signal is transmitted at any symbols other than the last symbol in the normal subframe; and transmit to the UE a downlink control information containing a sounding reference signal request field to trigger at least one sounding reference signal transmission, wherein a value of the sounding reference signal request field indicates two or more sounding reference signal parameter sets of the one or more sounding reference signal parameter sets.

13. The base station of claim 12, wherein the at least one processor is configured to cause the base station to:

configure a bit width of the sounding reference signal request field in the downlink control information, wherein the sounding reference signal request field is configured for downlink control information format 0/1A/2B/2C/2D for a serving cell that is not a licensed-assisted access cell.

14. The base station of claim 13, wherein when a single bit sounding reference signal request field is configured for the downlink control information format 0/1A/2B/2C/2D for a serving cell that is not a licensed-assisted access secondary cell and 2 sounding reference signal parameters sets are configured, a sounding reference signal transmission corresponding to both sounding reference signal parameters sets is triggered if a value of the sounding reference signal request field is set to '1'.

15. The base station of claim 12, wherein the at least one processor is configured to cause the base station to:

configure a bit width of sounding reference signal request field in the downlink control information, wherein the sounding reference signal request field is configured for downlink control information format.

16. The base station of claim 15, wherein when 2 bits sounding reference signal request field is configured for the downlink control information format and more than three sounding reference signal parameters sets are configured, a sounding reference signal transmission corresponding to multiple sets is triggered if the value of the sounding reference signal request field is not set to '00'.

17. The base station of claim 12, wherein the at least one processor is configured to cause the base station to:

transmit to the UE a medium access control control element to activate or deactivate the one or more sounding reference signal parameters sets.

18. The base station of claim 17, wherein the medium access control control element has a fixed size and consists of a single octet containing N C-fields and 8-N R-fields where N is an integer greater than 1, and wherein each of the C fields is used to indicate whether the sounding reference signal parameters set corresponding to the C-field is activated or deactivated, and each R-field contains a reserved bit setting to '0'.

19. The base station of claim 17, wherein the medium access control control element has a fixed size and consists of three octets each containing N C-fields and 8-N R-fields, where N is an integer greater than 1:

a first octet is used to activate or deactivate sounding reference signal parameters sets associated with the sounding reference signal request field '01';

a second octet is used to activate or deactivate sounding reference signal parameters sets associated with the sounding reference signal request field '10';

a third octet is used to activate or deactivate sounding reference signal parameters sets associated with the sounding reference signal request field '11'; and wherein each of the C fields is used to indicate whether the sounding reference signal parameters set corresponding to the C-field is activated or deactivated, and each R-field contains a reserved bit setting to '0'.

20. A user equipment (UE), comprising:

at least one memory; and at least one processor coupled with the at least one memory and configured to cause the UE to:

receive from a base station a higher layer signaling for configuring one or more sounding reference signal parameter sets for transmission of a sounding reference signal, wherein the sounding reference signal includes a first sounding reference signal associated with a first trigger type and a second sounding reference signal associated with a second trigger type, the first sounding reference signal is transmitted at the last symbol in a normal subframe, and the second sounding reference signal is transmitted at any symbols other than the last symbol in the normal subframe; and receive from the base station a downlink control information containing a sounding reference signal request field to trigger at least one sounding reference signal transmission, wherein a value of the sounding reference signal request field indicates two or more sounding reference signal parameter sets of the one or more sounding reference signal parameter sets.

* * * * *